United States Patent
Calvignac et al.

(10) Patent No.: US 7,133,942 B2
(45) Date of Patent: Nov. 7, 2006

(54) SEQUENCE-PRESERVING MULTIPROCESSING SYSTEM WITH MULTIMODE TDM BUFFER

(75) Inventors: Jean Louis Calvignac, Cary, NC (US); Mohammad Peyravian, Morrisville, NC (US); Fabrice Jean Verplanken, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 840 days.

(21) Appl. No.: 10/017,171

(22) Filed: Dec. 7, 2001

(65) Prior Publication Data

US 2003/0108194 A1    Jun. 12, 2003

(51) Int. Cl.
G06F 13/00 (2006.01)
G06F 13/14 (2006.01)
G08C 15/00 (2006.01)
H04J 3/22 (2006.01)

(52) U.S. Cl. .......................... 710/52; 710/25; 710/58; 710/20; 710/21; 710/305; 710/308; 370/229; 370/257

(58) Field of Classification Search ........ 718/100–104; 710/52
See application file for complete search history.

(56) References Cited

U.S. PATENT DOCUMENTS

| | | | |
|---|---|---|---|
| 3,618,040 A | 11/1971 | Iwamoto et al. | 711/3 |
| 4,527,233 A * | 7/1985 | Ambrosius et al. | 711/167 |
| 4,718,006 A | 1/1988 | Nishida | 364/200 |
| 4,809,171 A * | 2/1989 | Dozier et al. | 712/20 |
| 5,021,945 A | 6/1991 | Morrison et al. | 364/200 |
| 5,301,333 A | 4/1994 | Lee | 395/725 |
| 5,327,419 A | 7/1994 | Clark et al. | 370/58.2 |
| 5,530,904 A * | 6/1996 | Koga | 710/52 |
| 5,594,918 A | 1/1997 | Knowles et al. | 395/800 |
| 5,598,579 A * | 1/1997 | Welker et al. | 710/22 |
| 5,692,119 A | 11/1997 | Koguchi et al. | 395/182.02 |
| 6,658,578 B1 * | 12/2003 | Laurenti et al. | 713/324 |
| 2003/0108194 A1* | 6/2003 | Calvignac et al. | 380/36 |

FOREIGN PATENT DOCUMENTS

EP      167061 A2 *  1/1986

OTHER PUBLICATIONS

J. L. Calvignac et al, Pending U.S. Appl. No. 09/771,472, filed Jan. 6, 2001, entitled Single-Cycle Hardware Implementation of Crypto-Function for High Throughput Crypto-Processing.

* cited by examiner

*Primary Examiner*—Lewis A. Bullock, Jr.
(74) *Attorney, Agent, or Firm*—Joscelyn G. Cockburn; James A. Lucas; Driggs, Hogg & Fry Co., LPA

(57) ABSTRACT

A parallel processing system includes a plurality of stages operatively coupled in parallel and operating simultaneously. Each stage including a process unit generating a predetermined function and a buffer coupled via a slow output and a slow input ports to the process unit. The buffer also includes a fast input port and a fast output port. A controller drives the buffer to operate in a Slow Read Phase when data is written from the buffer into the process unit, a Slow Write Phase when data is written into the buffer from the process unit, a Fast Write Phase when data is written at a fast rate into the buffer and a Fast Read Phase when data is read from the buffer.

8 Claims, 5 Drawing Sheets

TDM TEMPLATE

TDM RD or WRITE ADDRESS GENERATION

SEQUENCE-PRESERVING MULTIPROCESSING SYSTEM WITH MULTIMODE TDM BUFFER

CROSS REFERENCE TO RELATED PATENT APPLICATIONS

The present invention relates to patent application Ser. No. 09/771,472 (RAL920000119US1), filed Jan. 26, 2001, assigned to the assignee of the present invention. The referenced document describes a system that encrypts and decrypts data at giga-bits per second speed.

BACKGROUND OF THE INVENTION

1) Field of the Invention

The present invention relates to parallel processors computer system in general and in particular to the use of such computer systems in communications technology.

2) Prior Art

The use of parallel processing generically called multi-processing is well known in data processing technology. In conventional data processing a plurality of processors are constrained to process subportions of a partitioned task and/or individual tasks in a set of tasks. The prior art abounds with multiprocessor patents, examples of which include:

U.S. Pat. No. 4,718,006
U.S. Pat. No. 5,021,945
U.S. Pat. No. 5,327,419 and
U.S. Pat. No. 5,692,119.

Even though multiprocessing systems are well known and used in data processing their use in communications technology is somewhat limited.

In this technology several problems have to be overcome if the system is to function satisfactorily. Among the many problems is that of sequencing. In particular, the sequence of data at the output of the system should be the same as when the data was received at the input. The proper sequencing of data is particularly difficult in communications technology in which the data is delivered in units called a frame or packet which can be of different lengths.

Because of the difference in frame length, among other things, a processor could complete processing a short frame in less time than is required to process a long frame. As a consequence the processed short frame would be available at the output of the system before the processed long frame even though the sequence at the input was long frame followed by short frame.

To maintain the sequence the prior art uses complicated circuits to keep track of the sequence at delivery and at the output organizes the processed frames in the same order in which the frames were delivered at the input of the system. These circuits are costly and increase the cost of the system. In addition, additional silicon space is required to implement the circuits. In most designs silicon space is a scarce commodity and should be preserved whenever possible.

Another problem is throughput. In most communications networks data is received from a network operating at a particular data rate process by a receiving system and returned to the network. Usually, the processing rate of the receiving system is much slower than the data rate of the network. The discrepancy between data rates results in a bottleneck within the receiving system. In some applications the bottleneck is a negative that cannot be tolerated. As a consequence there is a need to provide receiving systems with throughput matching that of the network to which the receiving systems are connected.

SUMMARY OF THE INVENTION

According to the teachings of the present invention a parallel processing system including buffers and Time Division Multiplex (TDM) timings are used to ensure the throughput and sequence of frames at the input is identical to the sequence of frames at the output of said parallel processing system.

According to the teachings of the present invention a plurality of parallel connected task orientated devices, termed Process Units, are coupled through a plurality of buffers to an input bus and an output bus. Each buffer is coupled to a Time Division Multiple (TDM) Controller which causes the buffer to operate in a Fast Write Mode, a Fast Read Mode, a Slow Write Mode and a Slow Read Mode. During the Fast Write Mode data is written into the buffer from the input bus. During the Slow Read Mode data is read from the buffer into the parallel task orientated devices whereat the data is processed and is rewritten into the buffer during the Slow Read Mode. The data is then read out onto the output bus during the Fast Read Mode. In this document Mode, Cycle or Phase is used interchangeably.

By using parallel connected task orientated devices and TDM multiphase controlled buffers the data rate on the output bus can be made to match the data rate at the input. Likewise, the data sequence at input is identical to data sequence at output without the use of special circuits to arrange the sequence of the output data to match the sequence of the input.

In one embodiment of the present invention the parallel processing system of the present invention was used to implement Cryptography (Crypto) Functions, at relatively high data rate (e.g. 10 Gbps) in a communications network.

It should be noted the teachings of the present invention can be used to provide functions other than cryptography. Other advantages of the present invention will become apparent to those skilled in the art upon review of the specification and drawings set forth herein.

DETAILED DESCRIPTION OF THE PREFERRED EMBODIMENT

Figure 1:
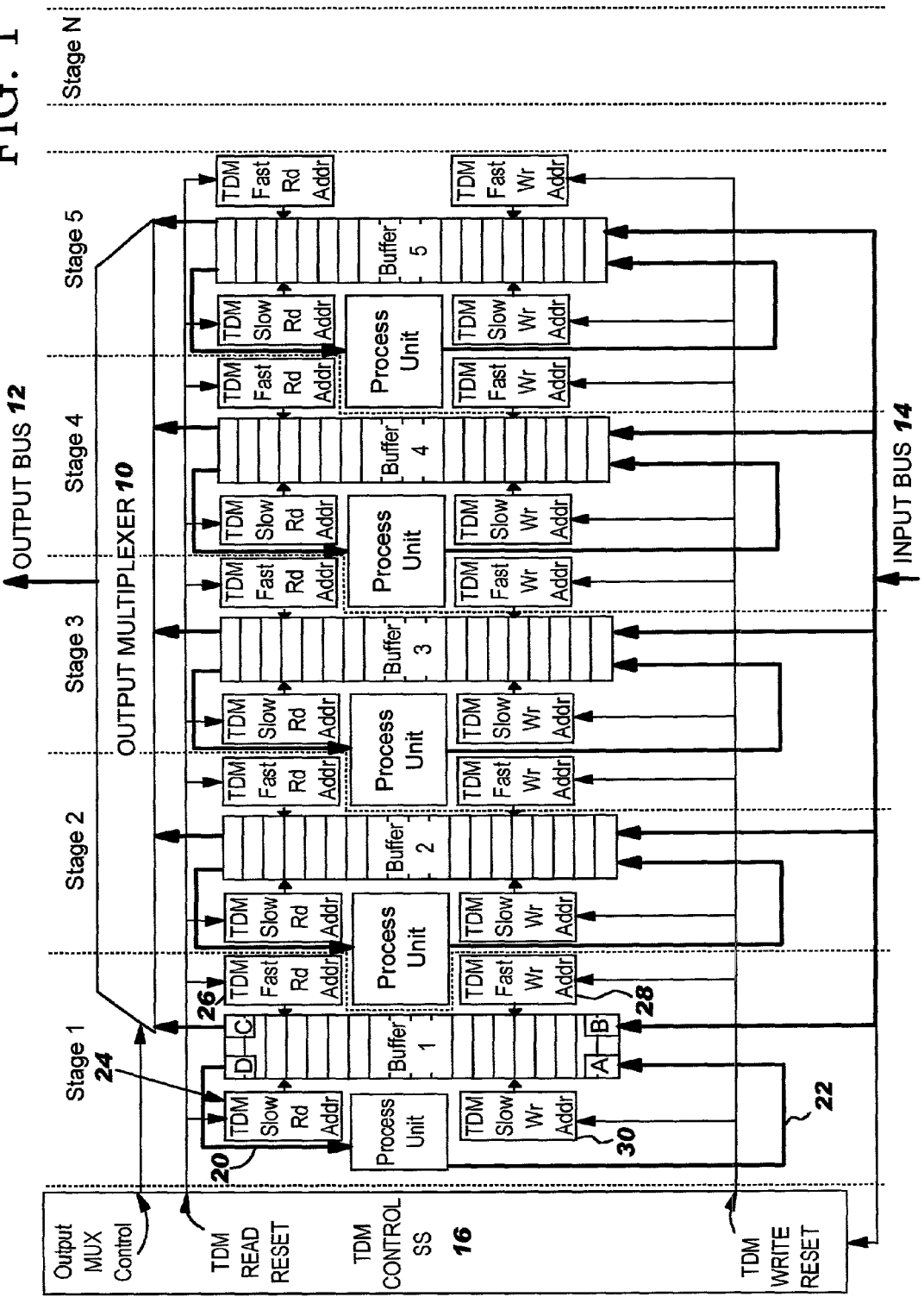
FIG. 1 shows a block diagram of the parallel processing system according to teachings of the present invention.

FIG. 1 shows a block diagram of a parallel processing system according to the teachings of the present invention. The parallel processing system includes a plurality of parallel stages labelled stage 1, stage 2, stage 3, stage 4, stage 5, . . . stage N. Even though the figure shows only five stages the number of stages which is used is the choice of the designer. In other words N can be any value desired by the designer. The output of each stage is coupled by respective buses to output multiplexer (MUX) 10. The output of MUX 10 is provided on output bus 12. The input bus 14 provides data at a rate e.g. 5 Gbps to the input of each stage. By running a plurality of stages in parallel or simultaneously the output data on output bus 12 can be made to be equivalent or greater than the data rate on input bus 14 even though a desired function is performed on the data in each stage of the parallel processing system. Time division multiplex (TDM) control subsystem (SS) 16, also called TDM Controller, generates time division signals which are outputted on conductors labeled Output MUX control, TDM Read Reset and TDM Write Reset. As will be explained subsequently these TDM signals are used to sequence data to output multiplexer 10 and control access to each of the buffers 1 through 5.

Still referring to FIG. 1, each of the stages are identical, therefore the description of one is intended to cover the description of the others. Stated another way the function which is provided by one stage is identical to the functions provided by the other stages. To this end each stage includes a buffer and a process unit. The process unit can be a PLA (programmable logic array), ASIC (application specific integrated circuit), microprocessor etc. The process unit performs a specific data processing function on the data which is fed into it over conductor 20. Once the process unit completes the desired data processing function, the data is fed over conductor 22 back into the buffer. The process unit can perform any function desired by the designer. In one embodiment the process units are cryptography devices providing encryption and/or decryption functions at a speed of 1 Gbps to a data frame received on the input bus 14, processed through the buffer and into the process unit. The above-identified application describes an encryption unit which could be used as a process unit in FIG. 1. The subject patent application is fully incorporated herein.

In addition, the data rate on Input Bus 14 (FIG. 1) is approximately 5 Gbps. The processing rate of each Process Unit is approximately 1 Gbps. By operating 5 (five) Process Units in parallel or simultaneously the data rate on Output Bus 12 is the same as the data rate on the Output Bus 14. If the data rate on Input Bus 14 was 10 Gbps, one would need ten stages operating at 1 Gbps each to provide a 10 Gbps at the Output Bus 12. Even though FIG. 1 presents the invention in a communications environment, this should not be construed as a limitation on the scope of the present invention since it is within the skill of one skilled in the art to use the invention in other technologies without deviating from the teachings or spirit of the present invention.

Still referring to FIG. 1, the buffer 1, like the others, includes ports A, B, C and D. For purposes of discussion port A is a slow write port in which data is written from the process unit back into buffer 1 during the Slow Write Phase. Port B is a fast write port in which data is received at media speed from input bus 14 during Fast Write Mode. Port C is the fast read port through which processed data is extracted during Fast Read Mode. Port D is the slow read port from which data is read from the buffer into the process unit during Slow Read Mode. The address selection for reading and writing data into the buffer is controlled by TDM slow read address generator 24, TDM fast read address generator 26, TDM fast write address generator 28 and TDM slow write address generator 30.

Figure 3:
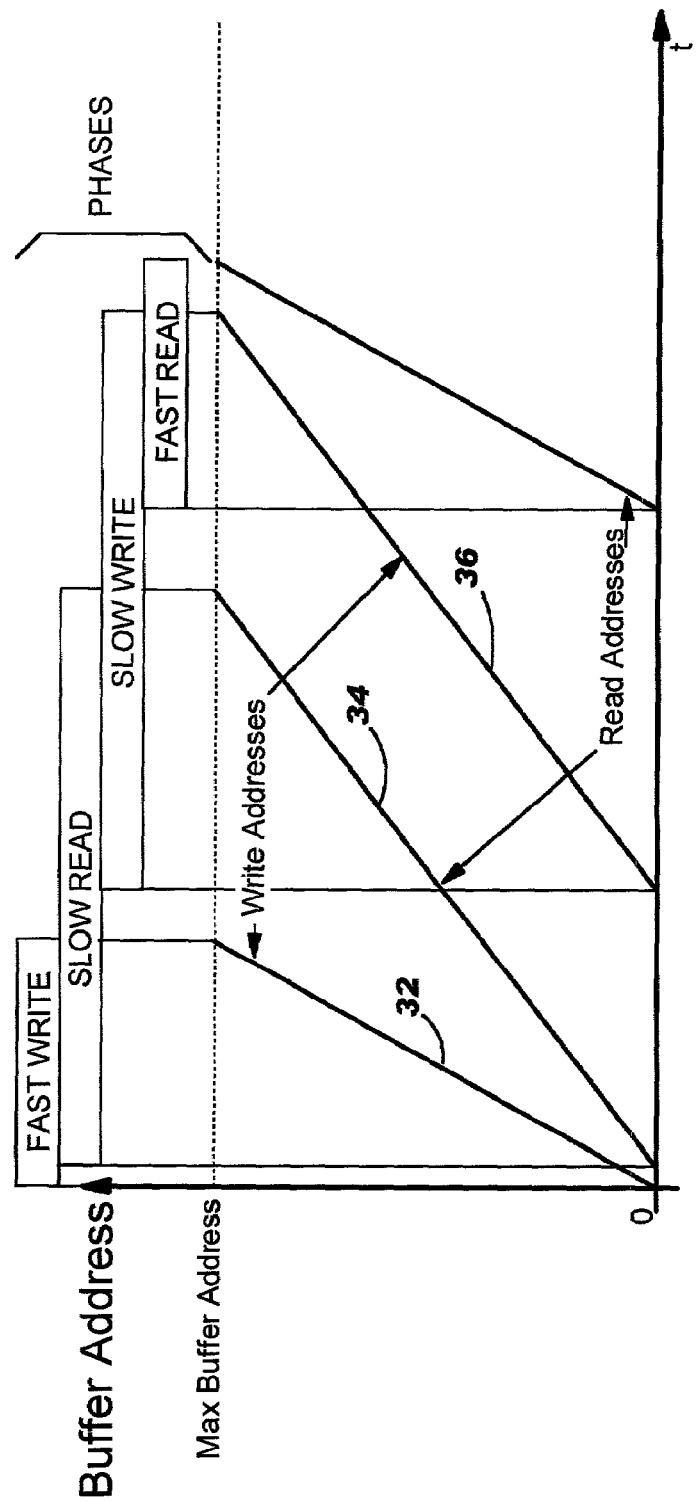
FIG. 3 shows a graphical representation of the TDM (Time Division Multiple) Template used to define the operating cycles of each buffer.

Each buffer has an access timing defined, in a TDM way, by a TDM template with four phases. Turning to FIG. 3, for the moment, the TDM template showing buffer access phases is shown. In the figure time is on the horizontal axis and buffer address is on the vertical axis. The four phases are fast write, slow read, slow write and fast read. Each phase operates on the full address range of the buffer in a linear way, i.e. scan entries from 0 to (E-1) in a buffer of E entries. The fast write phase is used to receive data at the rate of the high speed input port B. The slow read phase is used to retrieve data from the buffer and places the data on the lower speed bus of the process unit. In the case of an encryption process unit described in the above specification, the processing unit is processing data at 1 Gbps. The fast read phase is used to transmit modified data (i.e. data which has been processed through processing unit) from the high speed read port C to the high speed output bus 12. The slow write phase is used to write modified data from the process unit into the buffer.

Still referring to FIG. 3 the line labeled 32 shows address range for the fast write. The line labeled 34 shows the address range for the slow read. The line labeled 36 shows the address range for the slow write and the line labeled 38 shows the address range for the fast read. The TDM access scheme is repeated in each buffer. The TDM access scheme is identical for all buffers, but the M access TDMs are staggered by 1 over M so that the M TDMs spread evenly in time. It should also be noted the phases in each buffer are overlapped.

Figure 2:
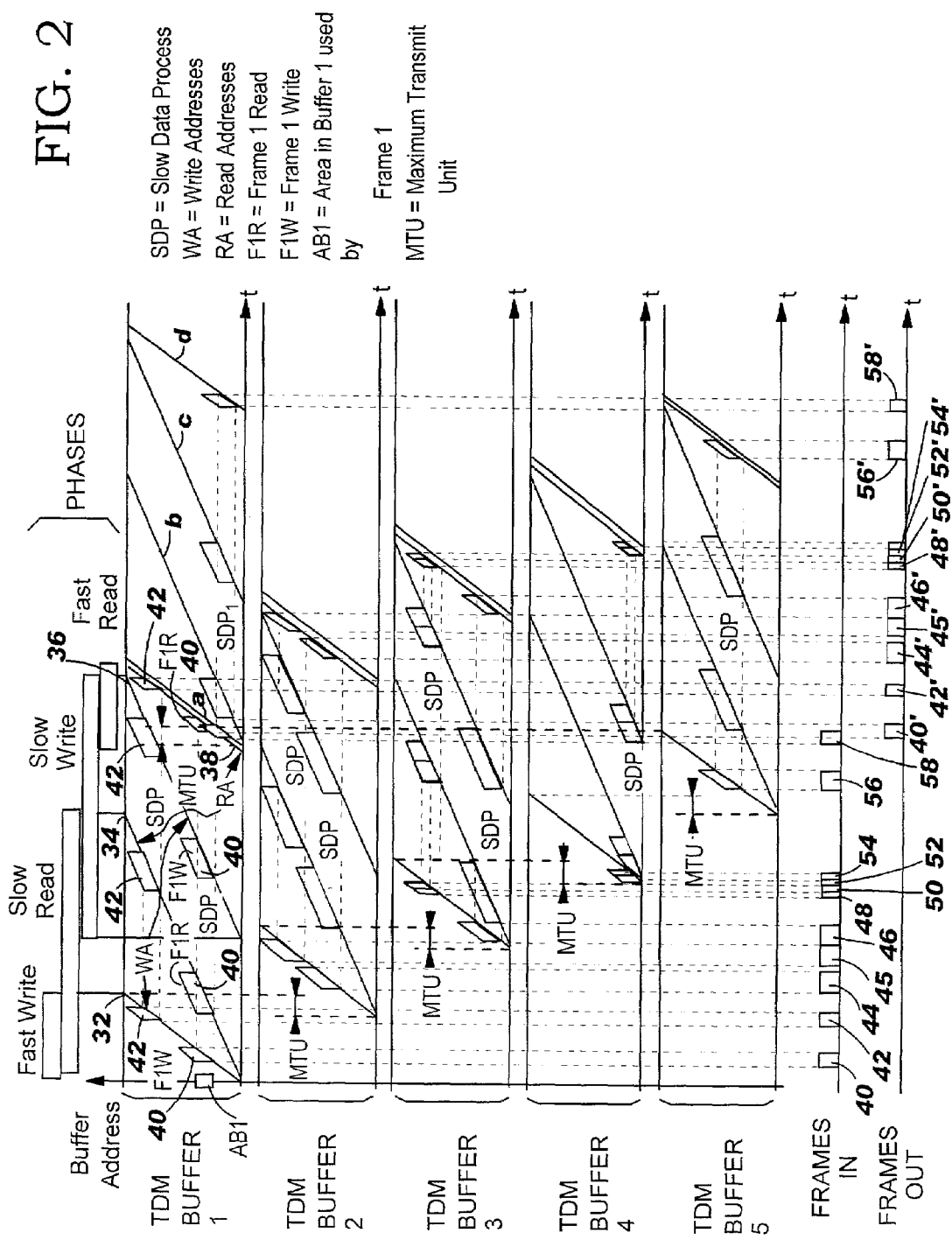
FIG. 2 shows a graphical representation of frames into, out and within the buffers. The sequence of frames into and out of the buffers is also shown.

FIG. 2 shows a graphical representation of data frames passing through each of the five buffers in FIG. 1. The FIG. 2, also, shows the sequence of the frames in are identical to the frequency of the frames out. Each of the buffers has the TDM template described in FIG. 3 plot in FIG. 2. Because the phases of the buffers in FIG. 2 are like the phases of the buffer in FIG. 3 common numerals are used for the address ranges in both FIG. 2 and FIG. 3. It should be noted the TDM phase of each buffer is positioned so that the ending of the fast write phase of buffer i+1, i being any buffer number, is earlier by at least 1 MTU time than the beginning of the fast write phase of buffer i. MTU time is the duration of the transmission of the largest possible frame. This allows one to always handle full frames in a single buffer (frames do not spread over different buffers). As a consequence the algorithm (rules) to write frames of data in a buffer is as follows:

If start of frame is received in a period of time containing only one fast write phase, then write the frame in the current buffer, under the current fast write phase.

If start of frame is received in a period of time containing two overlapping fast write phases then write the frame in the next buffer under the earliest fast write phase.

Thus successive incoming frames are deposited in buffer 1 to M then back to buffer 1 and so forth. In other words the frame can be rotationally scanned in the buffer. When a frame has been written in a buffer, it is read during the slow read phase to feed the low speed data process unit. This unit operates on data in a TDM way, i.e. the processing time of data is constant. Then, after a fixed latency the process data is available. The data is written back into the buffer, in the same buffer position as the original data during the slow write phase. Then, process frames are read out from the buffer under the fast read phase. The sequence of buffers read in fast read phase follows the sequence of buffers written in fast write phases.

Referring again to FIG. 2, the buffer numbers are identified on the lefthand side, namely TDM BUFFER 1, TDM BUFFER 2 and so forth. Buffer address is on the vertical axis and time is on the horizontal axis. The TDM template described in FIG. 3 is also shown in FIG. 2. The frames into the system via input bus 14 (FIG. 1) are labeled 40, 42, 44, 45, 46, 48, 50, 52, 54, 56 and 58. Frames 40 and 42 are written into Buffer 1. Frames 44 and 45 are written into Buffer 2. Frames 46, 48 and 50 are written into Buffer 3. Frames 52 and 54 are written into Buffer 4. Frame 56 is written into Buffer 5. Frame 58 is written into Buffer 1 at the beginning of a new Fast Write Phase. The frames out of the system on Output Bus 12 are in the same sequence as they were inputted into the system and are labeled 40' through 58'. These are the frames that would have been observed on output bus 12. It should be noted that in the graphical representation the width of the frame relative to the T axis gives the relevant size of the frames. In that regard frames 48, 50, 52 and 54 are relatively short frames, with frames 48 and 50 processed through buffer 3 and frames 52 and 54 processed through buffer 4. It should be noted in FIG. 2 FRAME IN represents input frames and FRAME OUT represents output frames.

Still referring to FIG. 2, processing of a frame through Buffer 1 is described. During the fast write phase of buffer 1, frame 40 is written into buffer 1 and is shown as a rectangular figure sitting on line 32. The area occupied in the buffer by frame 40 is also shown graphically in buffer 1. A second frame 42 is also written in a similar manner in buffer 1. During the slow read phase frame 40 is read into the process unit in FIG. 1. Likewise, frame 42 is read into the process unit. Both frames 40 and 42 are shown graphically in the process unit by placing the rectangular blocks on line labeled 34. During the period marked in the buffer as Slow Data Process (SDP) indicates the time when frames 40 and 42 are processed respectively through the process unit. The frames then go through the slow write process and are written back into the buffer. This is shown graphically by the frames sitting on line 36. Frames 40 and 32 then go through the Fast Read Phase (shown graphically as line 38). The frames are then read out during the fast read phase as Frames Out 40' and 32'. As stated the frames at the output are in the same sequence as they were delivered at the input. The overlap MTU between Fast Read phases of successive buffers are shown in FIG. 2. In a similar manner the other frames can be traced through each of the buffers as was done with the frame 40 and 42.

Still referring to FIG. 2, with Frames 40 and 42 being forwarded on the Output Bus as Frames 40' and 42' the TDM Buffer 1 is ready to receive new frames. In this regard a new fast write phase is imposed on Buffer 1 and Frame 58 is written into the buffer indicated by line a. Line b indicates the slow read for Frame 58 which is processed by $SDP_1$ and written into the buffer (line c). Line d indicates the fast read out for Frame 58 which is represented by Frame Out 58' on the Output bus. It should be noted that the second Fast Write phase a overlaps the preceding Slow Write phase.

Based upon the above description it is well within the skill of one skilled in the art to trace the frames, graphically depicted in FIG. 2, through Buffer 2 through Buffer 5. As a consequence further description in this regard will not be given.

Figure 4:
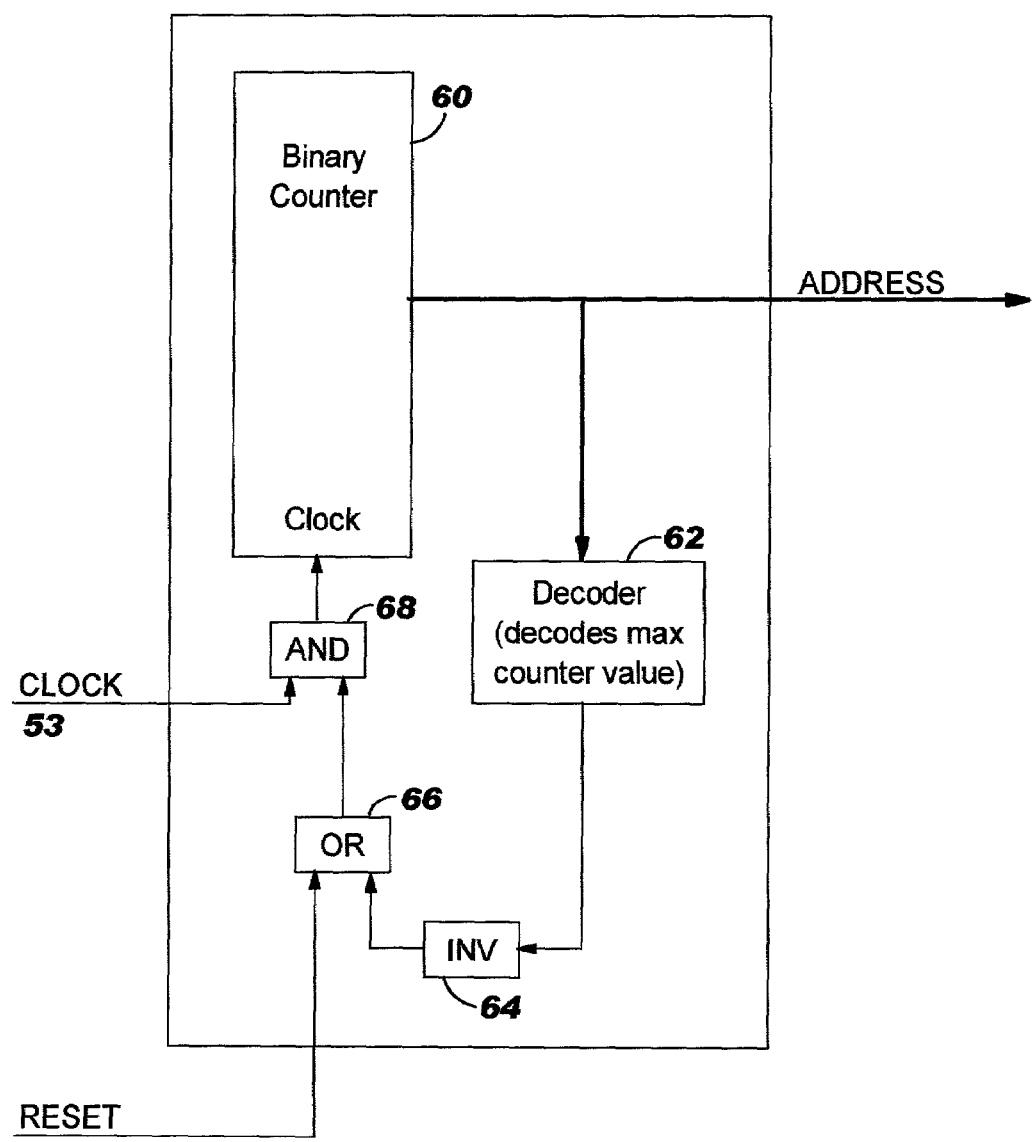
FIG. 4 shows a circuit diagram for the TDM Read or Write address generator.

FIG. 4 shows a block diagram of a TDM read or write address generator. The read and write generators that are associated with each buffer in FIG. 2 are identical. Therefore, the description of FIG. 4 is intended to cover the description of all the address generators used in the present invention. The TDM Read or Write Generator generates the addresses whereat date is written in the buffers. The TDM read or write address generator includes a binary counter 60 having a clock port to which a clock is connected and an address port to which an address bus is connected. The address bus provides the address that is used for accessing the buffer. A decoder 62 is connected to the address bus. The output of decoder 62 is connected to an inverter 64. The output of inverter 64 is connected to one of the inputs of an OR gate 66 and the other input of OR gate 66 is connected to a reset signal line which is activated by the TDM controller subsystem 16 (FIG. 1). The output of OR gate 66 is fed into a first leg of AND gate 68. The second input of AND gate 68 is tied to a clock line 53 and the output of AND gate 68 is connected to the clock port of the binary counter 60. In operation the binary counter is made to advance by clock pulses generated on the clock line 53. As the binary counter counts up the address keeps changing on the address bus and data can be written or read at the respective addresses in the buffer until the maximum address is reached. At this point the decoder output is inverted and is used to reset the counter back to 0 for the other phase of the counter. Reset from the TDM controller subsystem 16 on the reset line also resets the counter to 0.

By varying the speed of the clock on clock line 53 data can be written into and read from the buffer at a fast rate and read from and written into the buffer at a slow rate. Turning to FIG. 1 for the moment each buffer is controlled by a TDM Fast Write (Wr) Address (Addr) generator 28, TDM Fast Read (Rd) Addr generator 26, TDM Slow Rd Addr generator 24 and TDM Slow Wr Addr generator 30. Each of the TDM generators includes a clock line 53 (FIG. 4). The speed of the clock on the clock line determines the speed at which data is written and read from the buffer. As a consequence to write data at a fast rate from Input Bus 14 into the TDM buffer the clock on Clock line 53 (FIG. 4) runs at a fast speed to mirror the speed of data on the bus. Likewise, to write data into the TDM buffer at a slow rate the speed of the clock on clock line 53 mirrors that of the process speed. Reading of the buffer is controlled by the same Fast/Slow clock used with writing.

Figure 5:
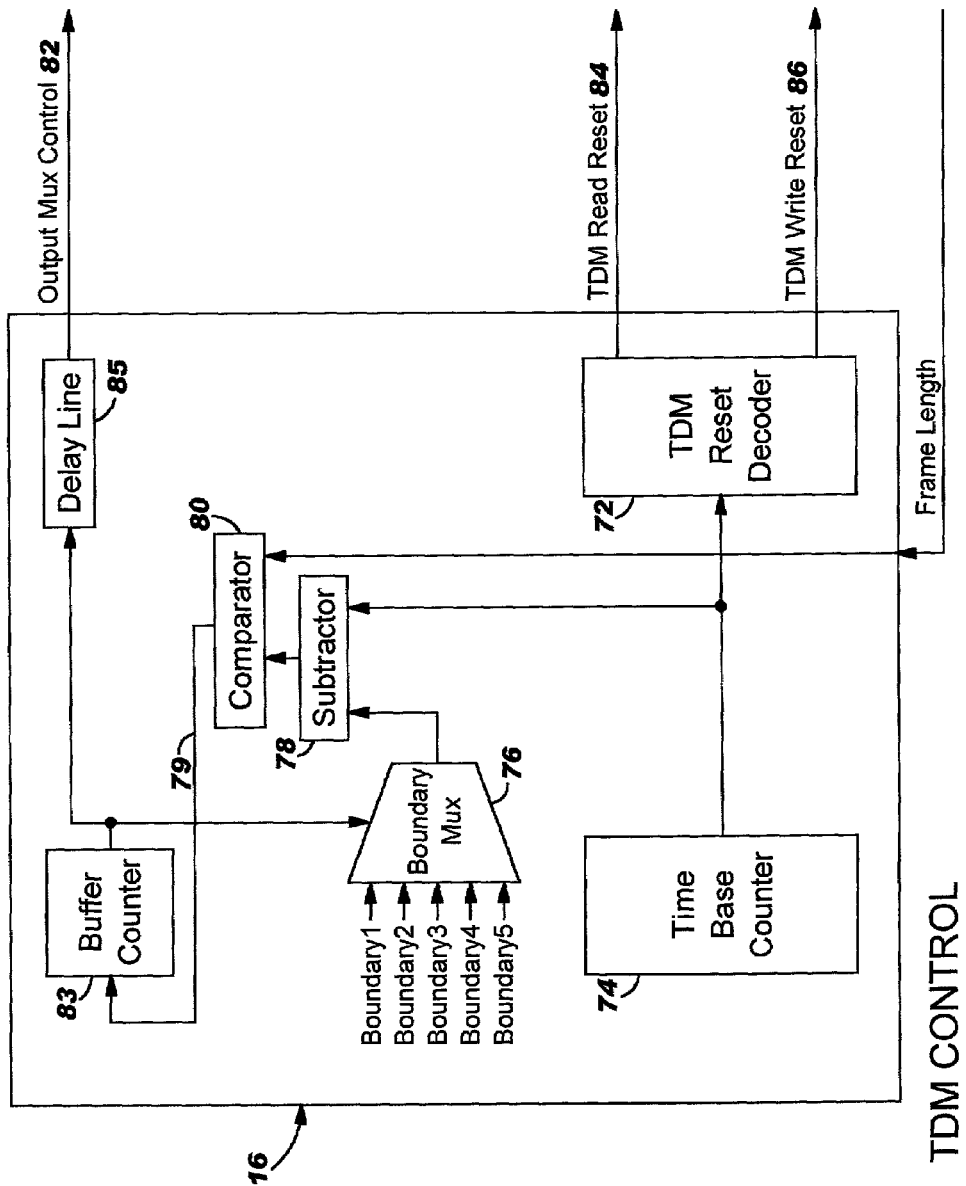
FIG. 5 shows a circuit diagram for the TDM Controller.

FIG. 5 shows a block diagram for the TDM controller subsystem (FIG. 1). The TDM controller subsystem 16 generates signals on the line labeled Output MUX Control 82 that selects which one of the buffers in FIG. 1 is gated to Output Bus 12. The signals output on the line labeled TDM Read Reset 84 is used to reset the buffers after a Read (Fast or Write) operation. Likewise, the signal on the line labeled TDM Write Reset 86 resets the buffers after a Write (Fast or Slow) operation. In one embodiment of this invention, 10 pulses are outputted on the Read Reset and Write Reset lines, respectively. Each buffer requires two reset pulses, one for the Fast Read and one for the Slow Read. Likewise, for the Write operation a reset pulse for the Fast Write and a reset pulse for the Slow Write are required. Because each buffer requires two pulses for a reset and there are five buffers the TDM reset decoder generates 10 pulses for read reset and 10 pulses for write reset. Of course the number of pulses generated depends on the design and should not be construed as a limitation of the scope of the invention.

Still referring to FIG. 5, the TDM control subsystem includes TDM reset decoder 72, time based counter 74, boundary multiplexer (MUX) 76, subtractor 78, comparator 80, buffer counter 83 and delay line 85. The named components 72 through 85 are interconnected as shown in FIG. 5. The time based counter 74 is a free running counter which counts from time 0 through the maximum TDM period roll over and begin counting again. The output of the counter is fed into subtractor 78 and TDM reset decoder 72. The TDM reset decoder decodes values of time based counter 74 to generate the TDM read reset pulses and TDM write reset pulses. These time based pulses are generated and is used to reset the counter at the end of the respective read and write cycles. In one embodiment there are 10 TDM read reset pulses, one for TDM slow read address generator and one for TDM fast read generator of each buffer. There are 10 TDM write reset pulses, one for TDM slow write address generator and one for TDM fast write address generator of each buffer. The buffer counter 83 points to the buffer currently receiving frame data. The buffer counter 83 is incremented by signals on line 79 when an incoming frame is too large to fit completely in the current buffer. As a consequence the signals generated by boundary MUX 76, Subtractor 78 and Comparator 80 is active on line 79 when the space in current buffer is not sufficient to hold the incoming frame. It should be noted that the data from the same frames are stored in one buffer. Therefore, if the remaining space in the buffer is less than the space needed to accommodate the particular frame the frame will be written in the next buffer. The next buffer is the one that the output MUX control signal on the line labeled output MUX control 82 is selected for output on the output bus.

Still referring to FIG. 5, it should be noted that space in each of the TDM buffers has a linear relationship with time. Therefore, the space remaining in the buffer is proportional to the time for writing the buffer and vice versa. With that relationship the inputs labeled Boundary into Boundary MUX 76 represent the time based counter value reached at the end of the fast write phase in each buffer. Because there are five buffers in this example five boundary inputs labeled Boundary1, Boundary2, Boundary3, Boundary4, and Boundary5 are shown in the figure. The buffers counted in counter 83 select the buffer which is presently receiving data and that selected boundary is subtracted in subtractor 78 from the time based counter value with the results reflecting the current available space in the current buffer. The comparator 80 compares the available space in the current buffer against the length of the incoming frame provided on the line labeled Frame Length which is received before the first byte of the incoming frame. If the frame length is greater than the available space then the buffer counter is incremented to select another buffer. It should be noted that even if part of the incoming frame is written to the present buffer it does not affect the operation of the design because at the output only the buffer in which the complete frame is written will be selected. The buffer counter value is delayed in delay line 85 by the fixed value equal to the delay separating the fast read from the fast write phases so that the selection of which buffer to read in the fast read phase is done at the appropriate time via the output MUX control bus 82.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A communication parallel processing system comprising:
   an input bus;
   N task orientated processing devices, wherein N is greater than 1 and each of the task-oriented devices provides a particular function;
   M buffers connected to said input bus, wherein M is greater than 1, each one adaptable to operate in a plurality of different phases operatively coupled to the N task orientated processing devices; said phases including a Fast Write Phase, a Slow Read Phase, a Slow Write Phase, and a Fast Read Phase; and
   a Time Division Multiplex Control mechanism operatively connected to the M buffers and imposing respective ones of the different phases on said M buffers to deliver outputs from said buffers to an output bus in the order that inputs were outputted on the said input bus; wherein said each one of the M buffers further includes a slow write port receiving data if said each one of the M buffers is in the Slow Read Phase, a slow read port providing data if said each one of the M buffers is in the Slow Read Phase, a fast write port receiving data if said each one of the M buffers is in a Fast Write Phase and a Fast Read Phase providing data if said each one of the M buffers is in a Fast Read Phase.

2. The parallel processing system of claim 1 wherein M=N.

3. The parallel processing system of claims 1 or 2 wherein the particular function includes cryptography.

4. A communication parallel processing system comprising:
   an input bus;
   N task orientated processing devices, wherein N is greater than 1 with each of the task-oriented devices providing a particular function;
   M buffers connected to said input bus, M greater than 1, each one adaptable to operate in a plurality of different phases operatively coupled to the N task orientated processing devices;
   a Time Division Multiplex Control mechanism operatively connected to the M buffers and imposing respective ones of the different phases on said M buffers to deliver outputs from said buffers to an output bus in the order that inputs were outputted on the said input bus; said Time Division Multiplex mechanism including one TDM slow read address generator operatively coupled to at least one of the M buffers, one TDM Slow Write address generator operatively coupled to the at least one of the M buffers, one TDM Fast Read address generator operatively coupled to the at least one of the M buffers, and at least one TDM fast write address generator operatively coupled to said at least one of the M buffers; and
   a TDM Control circuit arrangement generating an output MUX control signal that drives said output multiplexor, a TDM Read Reset signal that drives the TDM slow read address generator and the at least one TDM Fast read address generator and a TDM write reset signal that drives the TDM fast write address generator and the TDM slow write address generator.

5. The parallel processing system of claim 4 wherein the TDM address generator includes a binary counter;
   an address bus operatively coupled to the binary counter;
   a decoder operatively coupled to the address bus;
   an inverter operatively coupled to the decoder;
   an OR gate having a first input coupled to the inverter and a second input coupled to a Reset signal; and
   an AND gate having a first input coupled to the OR gate, a second input coupled to a clock line and an output coupled to the binary counter.

6. The parallel processing system of claim 4 wherein the TDM control circuit arrangement includes
   a time base free running counter;
   a TDM Reset Decoder operatively coupled to the output of the time base, free running counter;
   a circuit arrangement that monitors space available in each of the M buffers and outputs a control pulse if the available space is less than the space required to store a predetermined size data block;
a delay line; and
a buffer counter operatively coupled to the delay line and the circuit arrangement.

7. The parallel processing system of claim 6 wherein the predetermined size data block includes a data frame or data packet.

8. The parallel processing system of claim 7 wherein the space monitoring circuit arrangement includes a boundary MUX having an input from the buffer counter and a plurality of inputs of boundary signals one from each buffer indicating address reached in each buffer at end of fast write phase;
a subtractor responsive to output signal from the boundary MUX and output signal from the time base counter; and
a comparator responsive to an output signal from said subtractor and a signal indicating length of the data frame.

* * * * *